US012629855B2

(12) United States Patent
Steffen et al.

(10) Patent No.: US 12,629,855 B2
(45) Date of Patent: May 19, 2026

(54) MATERIAL CUTTING DEVICE

(71) Applicant: Wacker Neuson Produktion GmbH & Co. KG, Reichertshofen (DE)

(72) Inventors: Michael Steffen, Munich (DE); Rudolf Berger, Gruenwald (DE); Katrin Eichler, Schweitenkirchen (DE)

(73) Assignee: Wacker Neuson Produktion, GmbH & Co. KG, Reichertshofen (DE)

( * ) Notice: Subject to any disclaimer, the term of this patent is extended or adjusted under 35 U.S.C. 154(b) by 524 days.

(21) Appl. No.: 18/097,716

(22) Filed: Jan. 17, 2023

(65) Prior Publication Data

US 2023/0226709 A1 Jul. 20, 2023

(30) Foreign Application Priority Data

Jan. 18, 2022 (DE) .................... 10 2022 101 073.2

(51) Int. Cl.
*B26D 3/06* (2006.01)
*B26D 5/08* (2006.01)
*B26D 7/26* (2006.01)

(52) U.S. Cl.
CPC .............. *B26D 3/06* (2013.01); *B26D 5/086* (2013.01); *B26D 7/2621* (2013.01)

(58) Field of Classification Search
CPC ........ B26D 3/06; B26D 5/086; B26D 7/2621; B28D 1/045; B28D 1/181; B23D 47/12; E01C 23/0933; H02K 1/12; H02K 5/04
See application file for complete search history.

(56) References Cited

U.S. PATENT DOCUMENTS

| | | | | | |
|---|---|---|---|---|---|
| 4,310,198 | A * | 1/1982 | Destree | E01C 23/0933 | 404/85 |
| 6,121,711 | A * | 9/2000 | Nakahara | H02K 3/522 | 310/216.096 |
| 2003/0196649 | A1* | 10/2003 | Vidmore | B27B 5/32 | 125/13.01 |
| 2006/0060179 | A1* | 3/2006 | Kingsley | E01C 23/0933 | 125/13.01 |
| 2009/0107476 | A1* | 4/2009 | Gobright, IV | B28D 1/045 | 125/13.01 |
| 2013/0247897 | A1* | 9/2013 | Ruffner | B28D 1/045 | 125/14 |

(Continued)

FOREIGN PATENT DOCUMENTS

| | | | | |
|---|---|---|---|---|
| CN | 107553602 | A | 1/2018 | |
| CN | 107558346 | A * | 1/2018 | |
| CN | 110306416 | A * | 10/2019 | E01C 23/0933 |

(Continued)

OTHER PUBLICATIONS

DE_102020100842_A1 (Year: 2021).*

(Continued)

*Primary Examiner* — Jonathan G Riley
(74) *Attorney, Agent, or Firm* — Boyle Fredrickson, S.C.

(57) ABSTRACT

A material cutting device includes a rotatably mounted tool holder configured to carry a cutting tool and a drive for rotating the tool holder. The drive includes an electric motor with a rotor and a stator. The axis of rotation of the rotor of the electric motor and the axis of rotation of the tool holder are arranged coaxially. The stator encloses the rotor over an angle of less than 360 degrees.

15 Claims, 4 Drawing Sheets

(56) References Cited

U.S. PATENT DOCUMENTS

| | | | | |
|---|---|---|---|---|
| 2017/0120436 | A1* | 5/2017 | Rudolph | B23D 45/16 |
| 2020/0023553 | A1* | 1/2020 | Timmons | B62B 3/12 |

FOREIGN PATENT DOCUMENTS

| | | | | |
|---|---|---|---|---|
| DE | 10 2014 010 354 | A1 | 1/2016 | |
| DE | 20 2019 103 132 | U1 | 9/2020 | |
| DE | 102020100842 | A1 * | 7/2021 | E01C 19/286 |
| EP | 0652622 | A2 * | 5/1995 | |
| SU | 1726273 | A1 | 4/1992 | |
| WO | WO-2007082066 | A2 * | 7/2007 | B23D 47/005 |
| WO | 2010114545 | A1 | 10/2010 | |

OTHER PUBLICATIONS

JP_62126852_A (Year: 1987).*
CN_107558346_A (Year: 2018).*
CN_110306416_A (Year: 2019).*
EP_0652622_A2 (Year: 1995).*
WO_2007082066_A2 (Year: 2007).*

* cited by examiner

MATERIAL CUTTING DEVICE

BACKGROUND OF THE INVENTION

1. Field of the Invention

The invention relates to a material cutting device, such as, for example, a joint cutter, an angle grinder, a chop saw, or a chain saw. The material cutting device may be movable on a frame or hand-held.

2. Description of the Related Art

A typical mobile joint cutter with belt drive serving as such a material cutting device is known from DE 10 2014 010 354 A1.

The joint cutter has a rotatable tool holder which supports a cutting disc which serves as a tool. The tool holder is usually driven by a belt drive, which in turn is driven by an internal combustion engine or electric motor. The motor is arranged above and—when viewed in the direction of travel—behind the cutting axis.

The downward (when the joint cutter is in its intended working position) and forward cutting depth relevant for practical use is limited by the cutting disc radius and, ideally, only by the radius of the tool holder (clamping fixture) for the cutting disc. Accordingly, it is advantageous if the diameter of the output side pulley is not larger than the diameter of the tool holder carrying the cutting disc.

For space reasons, the drive motor in this design must usually be offset behind the cutting shaft so that it does not project forward. In so doing, the forward direction of travel is the main cutting direction in which the joint cutter is moved. Accordingly, only part of the mass of the motor acts to serve as a cutting load and thus a load used to counteract any rising of the cutting disc from the material. In fact, due to the direction of rotation of the cutting disc, there is a tendency for the cutting disc to rise out of the material being cut.

A belt drive or even other types of indirect torque transmission require construction measures, which is associated with additional costs and a reduction in overall efficiency.

A direct drive of the tool holder without intermediate torque transmission is possible. In particular, an electric motor can be mounted directly on the cutting shaft for this purpose. However, common electric motors have a size required for the high power and torque demand, which requires a correspondingly large outer diameter of the stator or alternatively the motor housing. This outer diameter is generally larger than the diameter of typical clamping fixtures for the cutting discs. The possible cutting depth is thereby reduced.

SUMMARY OF THE INVENTION

The invention is based on a task of specifying a material cutting device in which the disadvantages present in the prior art are avoided.

According to the invention, the task is solved by a material cutting device having a rotatably mounted tool holder configured to carry a cutting tool, and a drive for rotating the tool holder. The drive comprises an electric motor including a rotor and a stator. An axis of rotation of the rotor of the electric motor and an axis of rotation of the tool holder are arranged coaxially. The stator encloses the rotor over an angle of less than 360 degrees.

The material cutting device may be, for example, a joint cutter, an angle grinder, a chop saw, or a circular saw. Accordingly, the cutting tool may, for example, be a cutting disc or a sawing disc.

The electric motor may be arranged on the cutting shaft so that an axis of rotation of the rotor is coaxial to the axis of rotation of the tool holder. In this way, no torque transmission or torque conversion device, such as, for example, a belt drive, is required. Rather, the electric motor directly drives the tool holder and thereby the cutting tool.

However, the electric motor used is not a conventional motor, but rather an electric motor in which the stator extends over an angle of less than 360°. Thus, the stator does not completely enclose the rotor, for example, in a ring-like or tube-like manner, as is the case in a conventional electric motor. Rather, the electric motor may be a segment motor in which the stator is located in only one or a plurality of segments.

In this way, it is possible to design the electric motor in such a way that, at least on one side (for example, downwards), the stator does not extend beyond the rotor diameter.

The electric motor can be a reluctance machine, in particular a synchronous reluctance machine. A synchronous reluctance machine with a segmented stator in which the stator extends only over a certain angular range (stator block) has proven to be particularly suitable.

In this way, the electric motor can be configured in such a way that the stator and the rotor including their housing (electric motor housing) do not extend downward in the cutting direction and forward (in the direction of travel) beyond the diameter of the tool holder (for example, a clamping fixture).

Since no torque transmission or torque conversion is required, considerable construction measures and thus costs can be saved. The material cutting device can have a higher overall efficiency due to the elimination of torque transmission, wherein the depth of cut is not reduced beyond the limitation imposed by the tool holder. In addition, the electric motor is arranged on a common axis with the tool holder, so that the weight force caused by the entire mass of the electric motor can be used as a counterforce against the forces acting during the separation operation. In particular, the electric motor pushes the cutting tool downward into the material to be separated.

The stator encloses the rotor over an angle of less than 360°. Hereby, the motor stator can no longer be configured as a closed rotating part or alternatively as a closed ring, but rather can only extend over a certain angular range. The stator can accordingly be configured as a stator segment or stator block and extend over an angle of, for example, 270° or less, 180° or less, 120° or less, or 90° or less. In practice, an enclosure of about 180° has been found to be well suited.

Accordingly, it is also possible to distribute a plurality of stator segments or alternatively stator blocks around the circumference of the rotor, thereby increasing the performance of the motor and, in particular, the torque of the motor.

The angular range over which the stator segment or, if applicable, the plurality of stator segments extend is selected in such a way that the stator does not, in any case, affect the usable cutting depth. In particular, the stator does not extend in the direction of the cutting location (separation location) beyond the diameter of the tool holder.

The stator may extend over an angle which is dimensioned such that the stator is located exclusively on one side of a boundary surface, wherein the boundary surface is defined as a virtual tangential surface on an outside of the tool holder.

The boundary surface may accordingly be defined as a virtual (imaginary) tangential surface that lies tangential to the outside of the tool holder (in particular, to the underside thereof). The stator should not extend beyond this boundary surface so as not to reduce the usable cutting depth. Rather, the cutting depth (separation depth) should be limited in this area solely by the diameter of the tool holder. Components of the electric motor, which is here, in particular, the stator, should not extend beyond the tool holder in the direction of the cutting location (separation location).

In one embodiment, the boundary surface may be a virtual horizontal plane defined as a tangential surface on an underside of the tool holder when the material cutting device is in an intended position. In this case, the material cutting device may be, for example, a joint cutter in which the cutting disc serving as the tool extends substantially downward to cut the material there.

In this case, the boundary surface limits the contour of the stator towards the bottom. The stator should accordingly not extend downward beyond the boundary surface or alternatively project downward beyond this boundary surface. Rather, the stator should be arranged exclusively above the boundary surface.

The lowest level to which the stator may extend downward is thus defined, in particular, by the cylindrical outer side of the tool holder.

The requirement for the stator accordingly also applies, where appropriate, to a housing which serves as the electric motor housing and at least partially encloses the stator.

The tool holder can be designed to be substantially rotationally symmetrical, wherein the tool holder has a maximum radius (clamping fixture radius), and wherein the stator does not extend beyond the maximum radius of the tool holder in a downward direction and in a forward direction when the material cutting device is in an intended working position. The intended working position depends in particular on the design of the material cutting device. If the material cutting device is configured as a joint cutter, the main direction of travel is a forward direction of travel. The cutting action is generated downwards.

The material cutting device can be a joint cutting device, with a chassis and with at least one running gear for moving the chassis, wherein the electric motor and the tool holder are arranged in a front area of the chassis, when seen in the main direction of travel, and wherein an electric energy storage device is provided for supplying the electric motor with electric energy.

The running gear may, for example, have an axle with two rollers. Thereby, it is possible to tilt the chassis around the running gear. However, the running gear will usually have two axles, each with two rollers, so that the entire joint cutting device is movable on four rollers. In addition, a guide handle may also be provided on the chassis for an operator to move the material cutting device.

The center of gravity of the electrical energy storage device can be arranged above the axis of rotation of the tool holder. This advantageously results in the weight of the electrical energy storage device, for example, a rechargeable battery, pressing the cutting tool downwards into the material to be separated. A counteracting of the upward movement that is frequently observed to occur during cutting operation due to rotation of the cutting tool can thereby be achieved.

The center of gravity of the battery should thereby overall be arranged closer to an area vertically above the motor axis of rotation (and thereby also the tool axis of rotation) than to an area above an axis of rotation of the rollers of the chassis. In particular, the center of gravity should possibly be placed as far forward as possible, in the direction of travel, to achieve the desired holding down of the cutting tool.

In one variant, the center of gravity of the electrical energy storage device may be positioned substantially vertical above the axis of rotation such that the weight of the energy storage device acts in the best possible manner to press down the cutting disc.

A battery receptacle may be provided to receive the electrical energy storage device, wherein the electrical energy storage device may be replaceable. The battery receptacle thereby receives the energy storage device in a replaceable manner, such that a used battery can easily and quickly be replaced with a fresh battery.

The chassis, relative to an intended working position, may have a lower area at the level of the electric motor and the tool holder, wherein the chassis can also have an upper area which is arranged above the lower area and is spaced away from the lower area by at least 400 mm. The lower and upper areas open up possibilities for suitably positioning the components required for the electrical power supply on the joint cutting device. The battery can thus, for example, be arranged in the lower area and a converter device in the upper area. Logically, the guide bracket for guiding the machine by an operator will also be arranged at the upper area.

Accordingly, a converter device may be provided in the upper or in the lower area for converting an electric direct current from the electric energy storage device into a current suitable for operating the electric motor.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications

BRIEF DESCRIPTION OF THE DRAWINGS

These and other advantages and features of the invention are elucidated in more detail below by means of examples with the aid of the accompanying figures, in which.

DETAILED DESCRIPTION

FIG. 1 to FIG. 4 show a first variant of a joint cutter serving as a material cutting device according to the invention.

Figure 3:
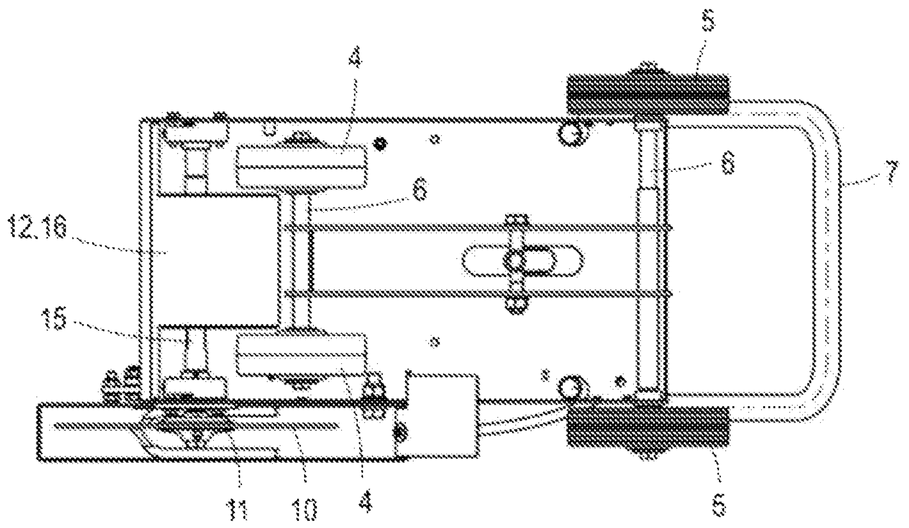
FIG. 3 shows a bottom view of the joint cutter of FIG. 1.

The joint cutter has a chassis 1 with a chassis frame 2 and a running gear 3. Two front wheels 4 and two rear wheels 5 are provided on the running gear 3, which wheels are each arranged on an axle 6 (FIG. 3).

A guide handle 7 is attached in a manner that it can be swiveled in height in the upper area of the chassis 1 or alternatively of the chassis frame 2, by means of which guide handle an operator can guide or alternatively push or move the joint cutter.

Figure 1:
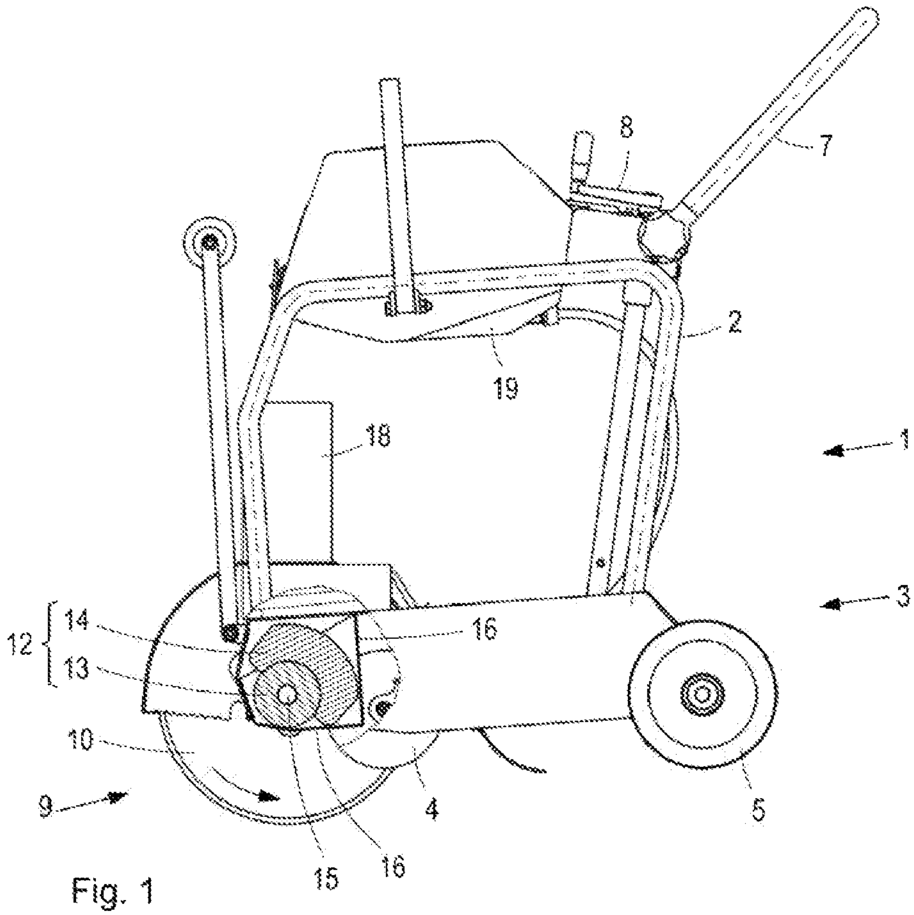
FIG. 1 shows a side view of a material cutting device according to the invention as a joint cutter.

Depending on the embodiment, the running gear 3 may be covered by a cover such that the upper and side surfaces are smooth, as shown, for example, in FIG. 1.

In the upper area of the chassis 1, a height adjustment 8 is also provided, which in the example shown is configured as a crank and with which an operator can adjust the lowering of a cutting device 9 relative to the rest of the chassis 1 in a manner known per se.

The cutting device 9 has a cutting disc 10 serving as a cutting tool, which is rotatably held in a clamping fixture 11 serving as a tool holder. The cutting disc 10 can be replaced if required, which is the reason for which the clamping fixture 11 can be easily opened and closed.

Coaxial to the clamping fixture 11, an electric motor 12 serving as a drive is provided, with a rotor 13 and a stator 14. A rotor shaft 15 of the rotor 13 extends to the clamping fixture 11 and can be directly driven in rotation by the rotor 13.

In conventional electric drives, the stator 14 would completely enclose the rotor 13 in a circular ring-like manner. In the material cutting device according to the invention, on the other hand, the electric motor 12 is configured as a segment motor, wherein the stator 14 extends only over a limited angular range smaller than 360°. In the example shown in FIG. 1 and—as a detail enlargement—FIG. 2, it can be seen that the stator only extends around the rotor 13 over an angular range (segment) of approx. 180°.

Rotor 13 and stator 14 are also enclosed by a housing 16. It can be clearly seen that the housing 16 can be very compact, due to the small size of the stator 14 which only extends over one segment.

Figure 2:
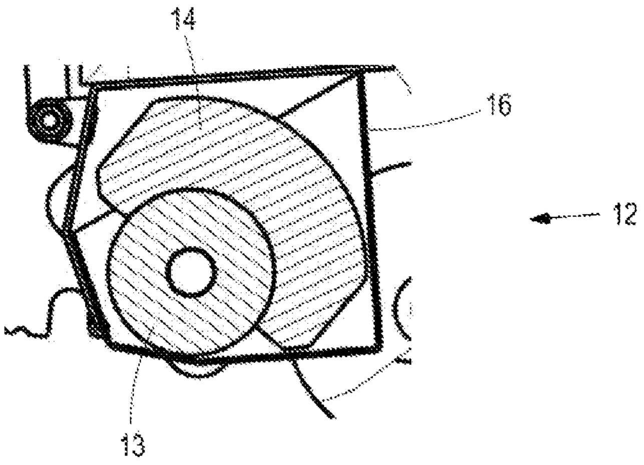
FIG. 2 shows a detail enlargement of the electric motor used in the joint cutter of FIG. 1.

It can, in particular, be seen in FIG. 2 that the stator 14 does not extend further downward than the rotor 13. In the case of a conventional electric motor with a ring-shaped stator, the stator would even take up considerable installation space below the rotor 13. This is not the case with the solution shown in FIG. 1 and FIG. 2. In particular, towards the bottom, the installation space is limited to the diameter of the rotor 13 (and the enclosing housing 16). More installation space is not taken up towards the bottom.

If the rotor diameter (inclusive of the housing 16) is smaller, or at least not larger, than the diameter of the tool holder or clamping fixture 11, the diameter of the clamping fixture 11 alone is the limiting factor for the cutting depth. The cutting disc 10 can thus penetrate very deeply into the material to be separated. The penetration depth is limited only by the diameter of the clamping fixture 11. The design of the electric motor 12 does not require any limitation of the penetration depth or alternatively cutting depth.

Figure 4:
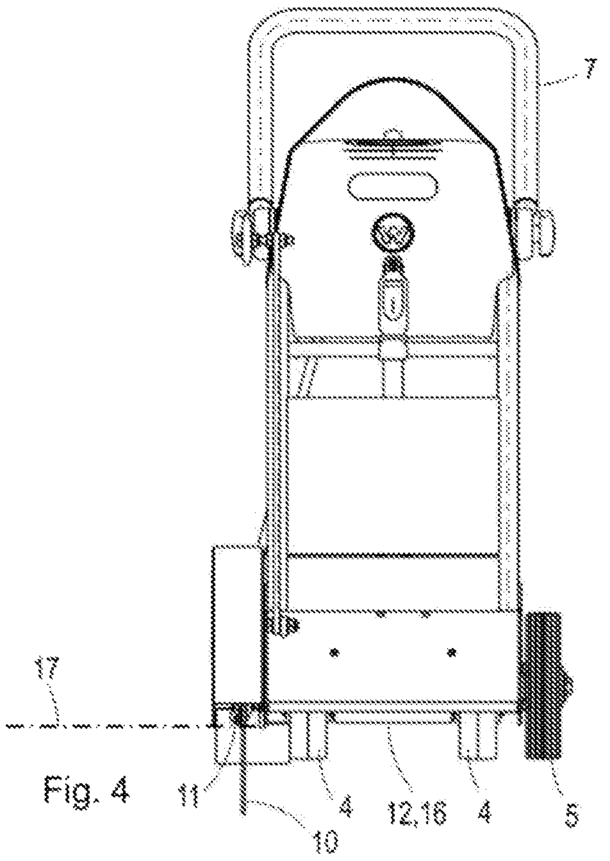
FIG. 4 shows a rear view of the joint cutter of FIG. 1.

This correlation is also shown in FIG. 4. There, the clamping fixture 11 and the electric motor 12 can be seen side by side in the rear view. It can, in particular, be seen that the electric motor 12 and thus the stator 14 inclusive of the housing 16 do not extend downward beyond a boundary surface 17 which, in this embodiment, is a virtual horizontal plane which is tangentially defined on the underside of the tool holder 11 and which extends perpendicular to the drawing plane. In so doing, the electric motor 12 does not reduce the possible downwards penetration depth of the cutting disc 10.

In the lower area of the chassis 1, a rechargeable battery 18 is arranged as an electrical energy storage device. The rechargeable battery 18 can, in particular, be replaceably mounted in a corresponding rechargeable battery holder so that it can be quickly replaced with a fresh rechargeable battery 18 if required.

A converter 19 is arranged in the upper area of the chassis 1, which serves to convert the direct current obtained from the battery 18 into a suitable current for the electric motor 12. This is, in particular, necessary if the electric motor 12 is a reluctance motor, in particular a synchronous reluctance machine with a segmented stator.

Figure 5:
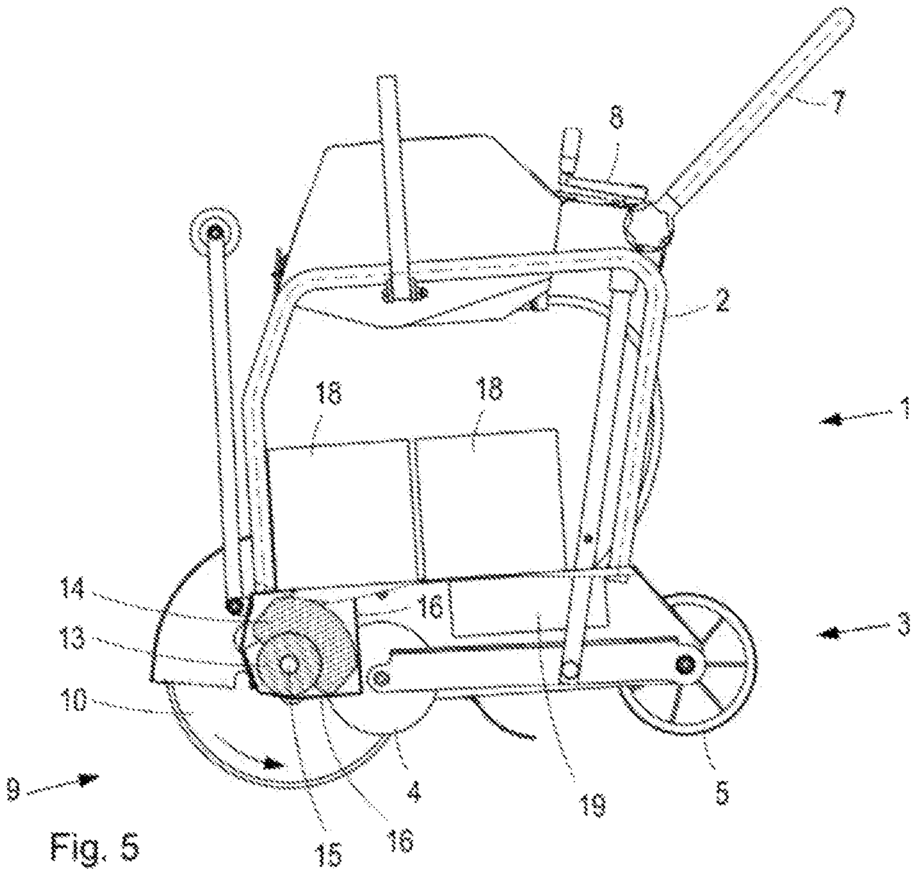
FIG. 5 shows a variant of the joint cutter of FIG. 1.
Figure 6:
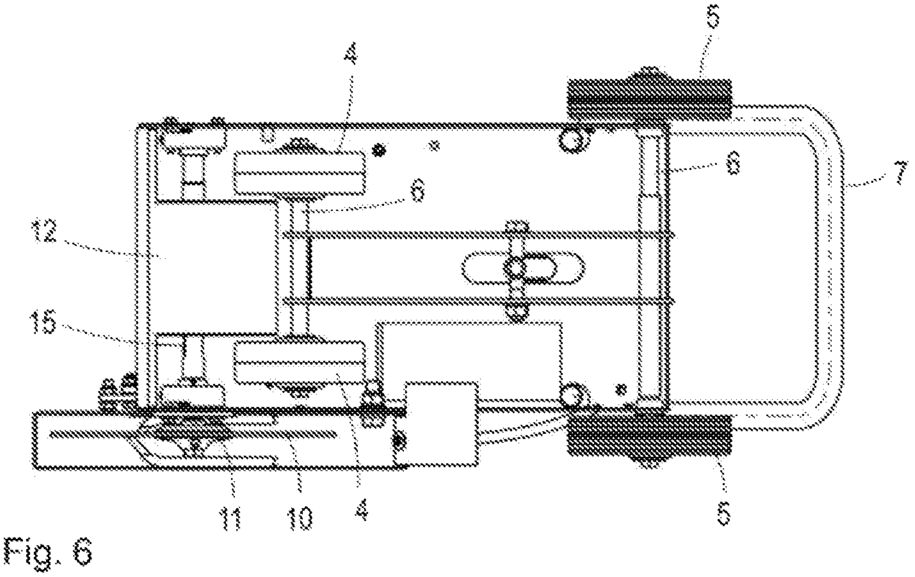
FIG. 6 shows a bottom view of the joint cutter of FIG. 5.
Figure 7:
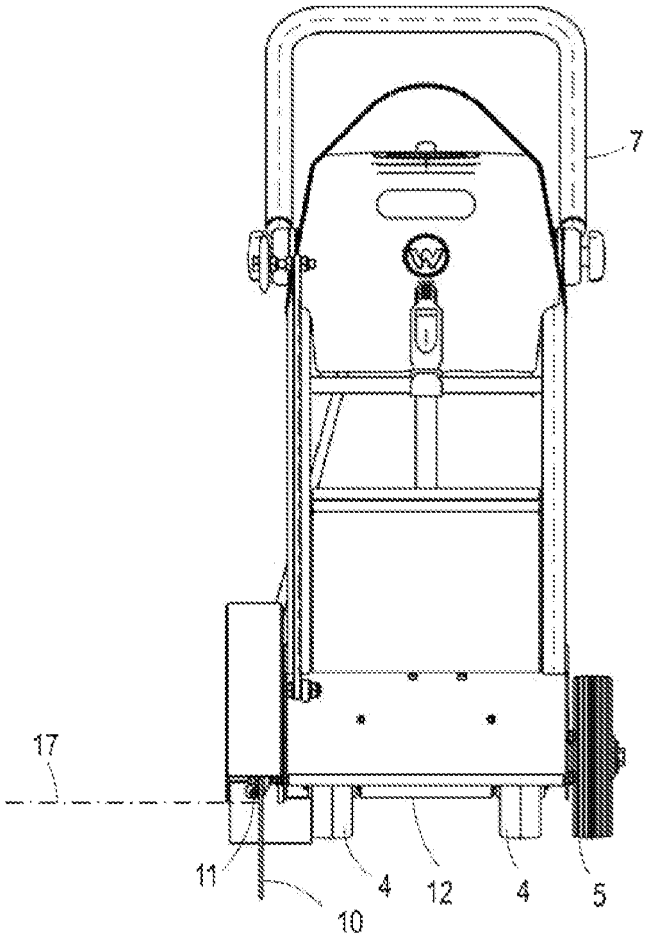
FIG. 7 shows a rear view of the joint cutter of FIG. 5.

FIG. 5 to FIG. 7 show a variant for a joint cutter as a material cutting device.

The joint cutter shown there is substantially consistent with the joint cutter of FIG. 1 to FIG. 4. However, in the example shown, the battery 18 is fixedly installed. In addition, the converter 19 is also arranged in the lower area of the chassis 1.

The design of the electric motor 12, on the other hand, is identical to that of FIG. 1 to FIG. 4.

The arrangement of the battery 18 above the clamping fixture 11 and the rotor 13 arranged coaxially thereto causes the mass of the battery 18, in particular, to press the cutting disc 10 downward into the material to be cut during operation of the joint cutter. The cutting disc 10 itself causes an upward tendency due to the rotary motion of the cutting disc (direction of the arrow in FIG. 5) and friction against the material to be cut. This upward movement is counteracted by the weight of the battery 18 and also of the converter 19.

Figure 8:
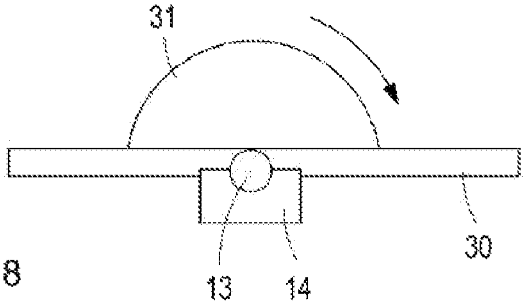
FIG. 8 shows a schematic representation of a circular saw as a further embodiment of a material cutting device according to the invention.

FIG. 8 shows a schematic representation of a circular saw as another example of a material cutting device.

The circular saw has a saw table 30 in which a saw disc 31 serving as a cutting tool is rotatably held by means of a tool holder (disc holder) that is not shown.

The tool holder is rotationally driven directly by an electric motor arranged coaxially to the tool holder, which motor has a rotor 13 and a stator 14.

In this example as well, the stator 14 is configured as a segmented stator 14 and encloses the rotor 13 over an angle of less than 360°. In the example shown in FIG. 8, the stator 33 extends over an angle of about 180°, analogous to the stator of FIG. 1 and FIG. 2.

In this embodiment, too, it is thus ensured that the tool holder with the saw disk 31 can be directly driven coaxially by a motor without the electric motor impairing or reducing the usable cutting height (obstacle free area of the saw disk 31 above the saw table 30).

The invention claimed is:

1. A material cutting device, comprising:
   - a rotatably mounted tool holder configured to carry a cutting tool; and
   - a drive for rotating the tool holder;

wherein

- the drive comprises an electric motor including a rotor and a stator; wherein
- an axis of rotation of the rotor of the electric motor and an axis of rotation of the tool holder are arranged coaxially; wherein
- the stator encloses the rotor over an angle of less than 360 degrees, wherein
- the tool holder has a maximum radius; and wherein
- the stator and the rotor of the electric motor do not extend in a downward direction beyond the maximum radius of the tool holder when the material cutting device is in an intended working position thereof.

2. The material cutting device according to claim 1, wherein the stator encloses the rotor over an angle of 270° or less.

3. The material cutting device according to claim 1, wherein the stator extends over the angle which is dimensioned such that the stator extends exclusively on one side of a boundary surface; and wherein the boundary surface is defined as a virtual tangential surface on an outer side of the tool holder.

4. The material cutting device according to claim 3, wherein the boundary surface is a virtual horizontal plane defined as a tangential surface on an underside of the tool holder when the material cutting device is in an intended working position.

5. The material cutting device according to claim 1, wherein the tool holder is configured to be substantially rotationally symmetrical; and wherein the stator and the rotor do not extend in a forward direction beyond the maximum radius of the tool holder when the material cutting device is in the intended working position thereof.

6. The material cutting device according to claim 1, wherein the material cutting device is a joint cutting device, comprising a chassis; and at least one running gear for moving the chassis;

wherein the electric motor and the tool holder are arranged in a forward area of the chassis, as seen in a main direction of travel; and wherein an electric energy storage device is provided for supplying the electric motor with electric energy.

7. The material cutting device according to claim 6, wherein a center of gravity of the electrical energy storage device is arranged above the axis of rotation of the tool holder.

8. The material cutting device according to claim 6, wherein the electrical energy storage device is replaceable.

9. The material cutting device according to claim 6, wherein the chassis, with respect to an intended working position, has a lower area at a level of the electric motor and the tool holder; and wherein the chassis has an upper area arranged above the lower area and spaced away from the lower area by at least 400 mm.

10. The material cutting device according to claim 9, wherein a converter device is provided in the upper area or in the lower area, the converter device being configured to convert an electric direct current from the electric energy storage device into a current suitable for operating the electric motor.

11. The material cutting device according to claim 1, wherein the electric motor has a single rotor and a single stator.

12. The material cutting device according to claim 2, wherein the stator encloses the rotor over an angle of 180° or less.

13. The material cutting device according to claim 1, wherein the material cutting device comprises one of a joint cutter, an angle grinder, a chop saw, and a circular saw, and wherein the cutting tool comprises a cutting disc or a sawing disc.

14. A joint cutting device, comprising:

a chassis;

at least one running gear for moving the chassis;

a rotatably mounted tool holder configured to carry a cutting tool; and a drive for rotating the tool holder, the drive comprising an electric motor including a rotor and a stator; wherein the electric motor and the tool holder are arranged in a forward area of the chassis, as seen in a main direction of travel; wherein an axis of rotation of the rotor of the electric motor and an axis of rotation of the tool holder are arranged coaxially; wherein the stator encloses the rotor over an angle of less than 360 degrees; and wherein the stator and the rotor of the electric motor do not extend in a downward direction beyond the tool holder when the joint cutting device is in an intended working position thereof.

15. The joint cutting device according to claim 14, further comprising an electric energy storage device that is configured to supply the electric motor with electric energy.

* * * * *